March 14, 1961 N. C. BEESE 2,975,075
METHOD OF EVAPORATING METALS
Filed Feb. 17, 1956

INVENTOR.
NORMAN C. BEESE
BY George Sipkin
Lee I. Huntzberger
ATTORNEYS 2,975,075
Patented Mar. 14, 1961

2,975,075

METHOD OF EVAPORATING METALS

Norman C. Beese, Verona, N.J., assignor, by mesne assignments, to the United States of America as represented by the Secretary of the Navy Filed Feb. 17, 1956, Ser. No. 566,313

16 Claims. (Cl. 117—107)

This invention relates to methods for evaporating metal and more particularly, relates to a method for providing an evaporated silver or gold metal coating on the inner surface of a bulb.

Devices utilized as high intensity light sources are generally mounted in outer bulbs that have silver inner reflecting surfaces. Silver as the reflecting surface metal is preferred over aluminum since, by its use, the light intensity and light efficiency are increased a considerable amount above similar lamps that have aluminized reflector surfaces.

Preparation of such silver reflecting surfaces invariably presents the difficulty of the inability to vaporize silver from the surface of a high melting point metal such as normally used for filaments, viz., molybdenum and tungsten. Silver, upon melting, shows no affinity for the molybdenum or tungsten filament and almost immediately after melting collects into a drop and falls off. This inability to wet tungsten and molybdenum occurs also with metals such as copper, gold, etc. Metals such as silver and gold do appreciably wet filaments made of platinum and tantalum but the latter metals are so prohibitively expensive as to obviate their use as filamentary materials in any practical situation.

In United States Patent No. 2,413,604 to W. H. Colbert et al., issued on December 31, 1946, there is disclosed a method of producing a silver coating on articles by evaporation of the silver from a filament consisting of either tungsten, tantalum, molybdenum and columbium, wherein the silver is alloyed with platinum and is heated on such filament and wherein said platinum causes the silver to wet, adhere and spread out over the filament surfaces so that the silver may be effectively used as an agent for coating the article. Here again the problem of the expensiveness of platinum as the silver alloying metal is presented.

It is, accordingly, the primary object of the present invention to provide an inexpensive effective method of evaporating silver or gold onto a surface wherein the final silver surface is of high reflectivity and relatively pure.

It is a further object of the present invention to provide an inexpensive method for producing an evaporated silver or gold surface wherein a flashing coil consisting of tungsten or molybdenum is utilized.

Generally speaking, and in accordance with the present invention, there is provided a method of producing coatings consisting of either gold or silver by evaporation of the gold or silver from a filament consisting of a material selected from the group consisting of molybdenum and tungsten comprising coating the filament with silicon and then using the silicon coated metal to vaporize pure silver or gold. The silver or gold adheres to such a filament in the molten condition, vaporizes readily, and produces a high reflective silver surface when the silver is evaporated onto such surface.

Other objects and many of the attendant advantages of this invention will be readily appreciated as the same becomes better understood by reference to the following detailed description when considered in connection with the accompanying drawings wherein.

Before explaining in detail the present invention, it is to be understood that the invention is not to be limited in its application to the details of construction and arrangement of parts illustrated in the accompanying drawings, since the invention is capable of other embodiments and of being practiced or carried out in various ways. It is to be understood also that the phraseology or terminology employed herein is for the purpose of description and not of limitation, and is not intended to limit the invention herein claimed beyond requirements of the prior art.

Figure 1:
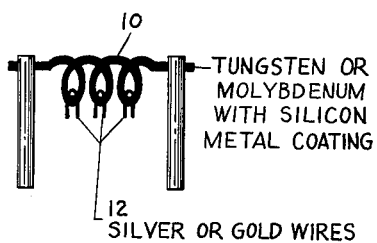
Fig. 1 is a view illustrating one suitable coil arrangement for carrying out the method of the present invention.

Referring now particularly to Fig. 1, there is shown a heating coil 10 consisting of either tungsten or molybdenum wire with pieces 12 of bent silver or gold strips disposed on the loops thereof. Coil 10 has been coated with silicon by applying thereto a suspension of silicon powder in an organic binder such as nitrocellulose lacquer, or ethyl or methyl cellulose in either amyl or butyl acetate. Although the weight of the silicon powder is not critical, it is preferable that it have a mass less than one percent of the weight of the coil. To form the coating, the coil having the silicon powder and binder thereon is flashed in a vacuum for a short time interval, say for a few seconds, at about 1500 to 2000° C. Such flashing may readily be carried out in a suitably evacuated chamber by passing current thru the coil, induction heating, and the like. After the tungsten coil is coated, it is inserted into the bulb wherein the silver is to be applied on the inner surface. As is shown in Fig. 1, the bent strips of silver wire 12 are hung over the loops of the coil and upon applying a source of heat in an evacuated atmosphere to the coil at temperatures of about 1000 to 2000° C. the silver melts and the molten silver instead of collecting into a globule which falls off the filament, wets the underlying silicon coated coil by capillary attraction and covers the surface of the filament. By continuing the heating at 1000 to 2000° C., the silver vaporizes and forms a highly reflective surface on the interior of the bulb. The rate of evaporation is determined by the temperature at which the coil is maintained. It is to be noted that the organic binder used is one which completely volatilizes at a temperature below 400° C., and this is the determining factor in the selection of such binder. Of course, the filament of coil 10 may be coated by the electrophoresis process in which case an organic binder is unnecessary.

Without subscribing to any particular theory as to the mechanism of the present invention, it is believed that a silver-silicon alloy may be formed which adheres to the underlying tungsten in contra-distinction to pure silver which adheres very poorly. It is also believed that the surface characteristics, e.g., surface tension is changed.

Figure 2:
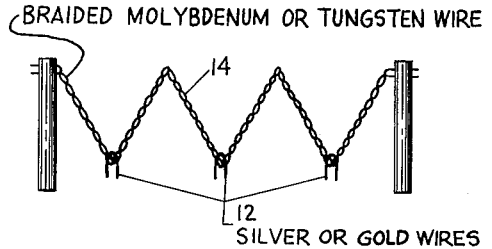
Fig. 2 is a view similar to that of Fig. 1 wherein there is utilized in the heater coil, braided or twisted wires.

Fig. 2 illustrates another arrangement wherein the heater coil 14 comprises small molybdenum or tungsten wires braided or twisted together to form a W-shaped filament. After coating coil 14 with silicon in accordance with the method herein described above pieces of pure silver ribbon are placed in the lower notches of the W and vaporized in a high vacuum onto the bulb surface. Here also a highly reflecting silvered surface is obtained.

To form the silicon coating, the tungsten or molybdenum filaments comprising the heater coils can be coated with the silicon powder as described above, drawn through a molten bath of silicon either in a high vacuum or in an inert atmosphere, or silicon may be electrolyzed or vaporized onto the base metal coils. Other metals, tantalum in particular, can be used in place of silicon. Because of the high melting point of tantalum, a tungsten coil cannot be conveniently dipped into molten tantalum, but a small tantalum wire may be twisted together with one or more tungsten or molybdenum wires to form the filament for flashing or vaporizing the silver.

Figure 3:
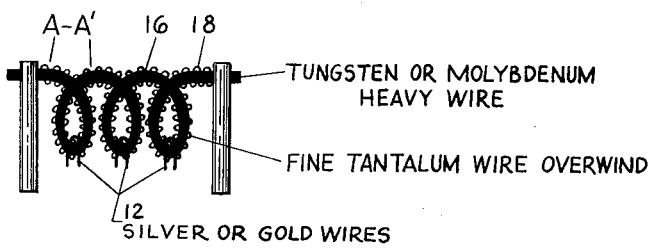
Fig. 3 is a view similar to Figs. 1 and 2 showing a heater filament with a tantalum wire overwind.

Fig. 3 illustrates an embodiment where the coil 16 comprises tungsten or molybdenum heavy wire with a fine tantalum wire overwind 18, the diameter of the tantalum wire being about .002" to .003" diameter. In place of the arrangement shown in Fig. 3, a tunsten tantalum alloy wire could also be used. In the embodiment shown in Fig. 3, upon melting, the silver or gold adheres to the tantalum wire so that, effectively, the coil is coated enabling the evaporation therefrom of the silver. The tantalum presents a surface for good adherence by the silver, the crevices in the coil increase such adherence and the net result is a heater element that is much cheaper than one made of pure tantalum.

Figure 4A:
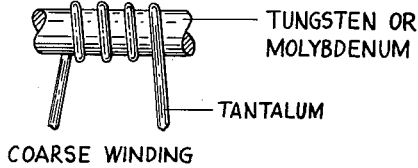
Fig. 4 is an enlarged view of section A—A' of Fig. 3 illustrating a coarse winding and a close winding arrangement of the tantalum around the heater coil.
Figure 4B:
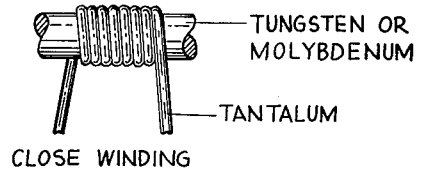

Figs. 4a and b which are enlargements of the length A—A' shown in Fig. 3, illustrate a coarse winding and a close winding embodiment of the tantalum on the molybdenum or tungsten base filament. The individual turns of the overwind tantalum coil may be closely spaced or widely spaced, the separation between adjacent turns preferably being less than the diameter of the silver wire or strip hung over the loops of the coil.

Obviously many modifications and variations of the present invention are possible in the light of the above teachings. It is therefore to be understood that within the scope of the appended claims the invention may be practiced otherwise than as specifically described.

I claim:

1. The method of producing coatings by evaporation of silver or gold from a filament selected from the group consisting of tungsten and molybdenum comprising applying to said filament a mixture comprising silicon powder dispersed in an organic binder, heating said applied filament in an evacuated atmosphere to volatilize said binder and to cause a coating of silicon to remain upon the surface of said filament, heating a metal selected from the group consisting of silver and gold on said coated filament in a high vacuum whereby said selected metal melts and wets said underlying coated filament and thereafter evaporates onto the surface being coated.

2. A method as defined in claim 1 wherein said binder comprises a material selected from the group consisting of ethyl and methyl-cellulose dissolved in a solvent selected from the group consisting of amyl and butyl acetate and nitrocellulose lacquer.

3. In the method of producing coatings by evaporation from a heated filament of tungsten in a partial vacuum of metals such as gold and silver which do not wet such filament, that improvement which comprises applying a coating of silicon to such filament prior to heating of the filament with the said metal wherein the silicon coating is applied by drawing the filament through a molten bath of silicon in an inert atmosphere.

4. In the method of producing coatings by evaporation in a partial vacuum from a heated filament of tungsten of metals such as gold and silver that do not wet such filament, that preliminary step which comprises applying a coating of silicon to such filament prior to heating of the filament together with the said metal wherein the silicon is applied to said filament by electrolysis.

5. In the method of producing coatings by evaporation in a partial vacuum from a heated filament of tungsten of precious metals such as gold and silver that do not wet such filament, that preliminary step which comprises applying a coating of silicon to such filament prior to heating of the filament together with the said metal wherein the silicon is applied to said filament by vaporization of the silicon there onto.

6. A method of coating a surface with silver or gold by evaporation technique comprising coating a coil formed of a material selected from the group consisting of tungsten and molybdenum with a mixture comprising silicon powder and an organic binder selected from the group consisting of ethyl and methyl cellulose in a solvent selected from the group consisting of amyl and butyl acetate, and nitrocellulose lacquer, heating said applied coil in an inert atmosphere at a temperature of 1500 to 2000° C. whereby a silicon coating forms on said coil, heating a metal selected from the group consisting of silver and gold on said coated filament at a temperature of 1000 to 2000° C. in an inert atmosphere whereby said metal first melts and wets the underlying surface of said coil and thereafter evaporates therefrom onto the surface to be coated.

7. In the method of depositing on a surface of an object an adherent coating of a precious metal such as silver and gold, by evaporation in a partial vacuum of the coating metal from a metallic heating filament that is disposed nearby said object in a common closed chamber that improvement therein which comprises applying at a temperature between about 1500° and 2000° C. to a heating filament in said chamber which is not wet by the coating metal but is wet by chemically uncombined fused silicon, a coating of chemically uncombined silicon, then applying a quantity of the coating metal in chemically uncombined form to the coated filament, and then heating said silicon coated filament together with the applied coating metal in a partial vacuum until the coating metal on the filament fuses, evaporates, and is deposited on said object.

8. The method as set forth in claim 7, wherein said precious coating metal is chemically uncombined silver.

9. The method as set forth in claim 7, wherein the filament is of tungsten.

10. In the method of depositing on a surface of an object an adherent coating of a precious metal such as silver and gold and which when fused does not wet filaments of tungsten and molybdenum, by evaporation in a partial vacuum of the coating metal from a metallic heating filament that is disposed in proximity to a face of the object to be coated and in the same closed space therewith, that improvement therein which comprises applying to said heating filament some chemically uncombined and unalloyed silicon, then attaching to such silicon carrying heating filament a quantity of said precious coating metal in unalloyed form, then heating the filament to a temperature at which the precious coating metal vaporizes from the filament and deposits on said object.

11. In the method of depositing an adherent coating of a vaporizable precious metal such as silver and gold, by evaporation in a partial vacuum of the coating metal from a heating filament of tungsten or molybdenum located in proximity to, and in the same space with, the surface of an object that is to be coated with the metal, that improvement therein which comprises the steps of precoating said filament with chemically uncombined silicon, then attaching the precious coating metal to the silicon coated filament, and then heating the filament in a partial vacuum in said same space to cause the coating metal to fuse, spread along the filament and be vaporized from the filament for deposit on the said surface.

12. In the method of depositing upon a surface of an object, an adherent coating of a vaporizable metal by evaporation in a partial vacuum of the coating metal from a heating filament which the coating metal, when fused, does not wet but which filament is wet by chemically uncombined silicon and which filament is disposed in proximity to, and in the same space with, said surface to be coated, that improvement therein which comprises the steps of precoating said filament with chemically uncombined silicon as a wetting agent, then attaching a quantity of the coating metal to said precoated filament, and then heating the precoated filament with attached coating metal in a partial vacuum in said same space to the vaporization temperature of the coating metal.

13. In the method as set forth in claim 12, the further improvement which comprises applying the silicon to the filament in the form of a powder carried in a liquid binder.

14. In the method as set forth in claim 12, the further improvement which comprises applying the silicon precoating to the filament by establishing contact between the filament and molten silicon.

15. The method as set forth in claim 12 wherein the coating metal is silver, and the filament is of a material selected from the group consisting of tungsten and molybdenum.

16. In the method of depositing on a surface of an object an adherent coating of a precious metal such as silver by evaporation of the coating metal in a partial vacuum from a metallic heating filament not wet by silver and that is disposed adjacent and in the same enclosure with said object, that improvement therein which comprises first applying to said heating filament and extending lengthwise along it, a chemically uncombined and unalloyed material which wets the filament and that is wet by said precious metal in molten form, then applying a quantity of said precious metal to said filament having said applied material, and then heating said filament together with said applied silver in said partial vacuum and in said enclosure until said silver fuses, spreads along the filament, evaporates and is deposited on said adjacent object.

References Cited in the file of this patent

UNITED STATES PATENTS

| | | |
|---|---|---|
| 2,384,576 | Swope | Sept. 11, 1945 |
| 2,432,657 | Colbert et al. | Dec. 16, 1947 |
| 2,450,857 | Colbert et al. | Oct. 5, 1948 |

FOREIGN PATENTS

| | | |
|---|---|---|
| 735,009 | Great Britain | Aug. 10, 1955 |
| 202,241 | Australia | Sept. 15, 1955 |
| 743,060 | Great Britain | Jan. 11, 1956 |

OTHER REFERENCES

Air Force Technical Report No. 6383, June 1951, pages 74 and 75 relied on.